No. 846,634. PATENTED MAR. 12, 1907.
J. E. VAN DEVENTER & L. SWANK.
CHEESE GUARD AND SUPPORT FOR CHEESE CUTTERS.
APPLICATION FILED AUG. 6, 1906.

3 SHEETS—SHEET 1.

Witnesses
Vernon Plummer
Thomas W. McMeans

Inventors
Lafe Swank
James E Vandeventer
By Bradford Hood
Attorneys

No. 846,634. PATENTED MAR. 12, 1907.
J. E. VAN DEVENTER & L. SWANK.
CHEESE GUARD AND SUPPORT FOR CHEESE CUTTERS.
APPLICATION FILED AUG. 6, 1906.
3 SHEETS—SHEET 2.
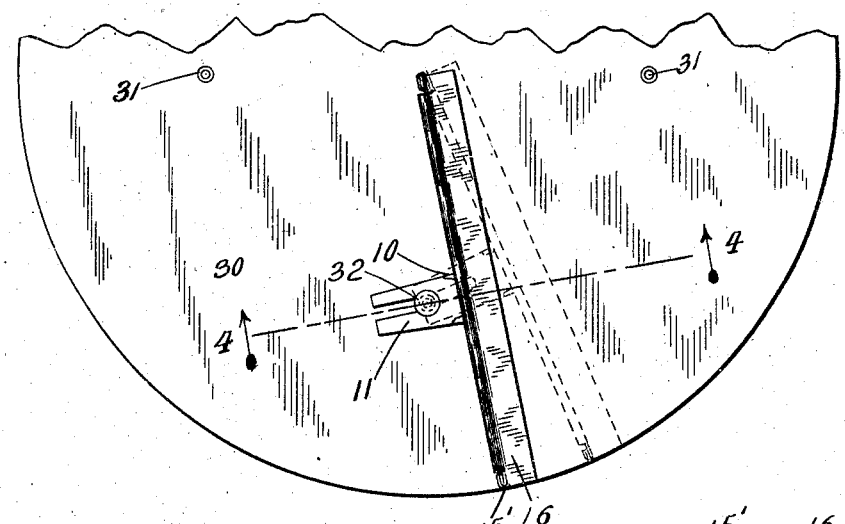
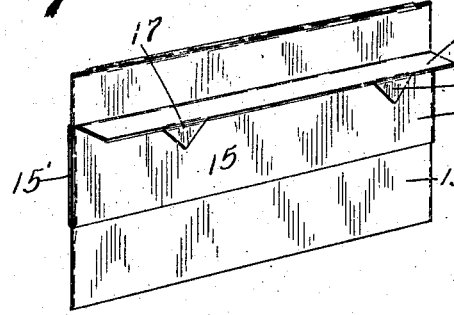
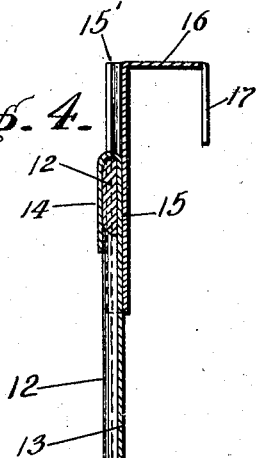
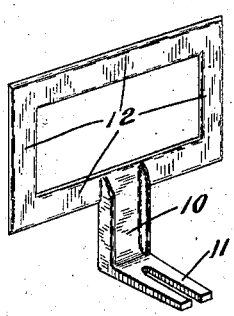
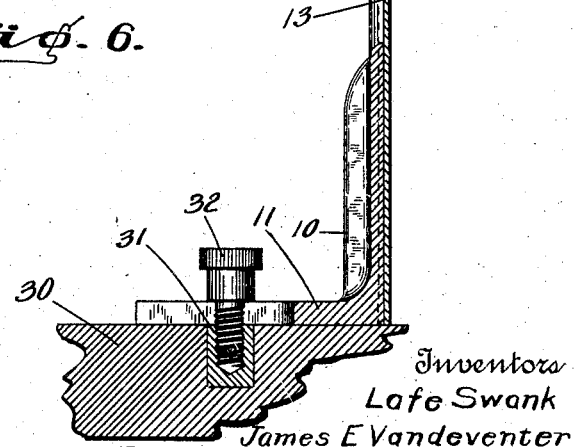
Witnesses
Vernon Plummer.
Thomas W. McMeans
Inventors
Lafe Swank
James E Vandeventer
By Bradford Hood
Attorneys
THE NORRIS PETERS CO., WASHINGTON, D. C.

No. 846,634. PATENTED MAR. 12, 1907.
J. E. VAN DEVENTER & L. SWANK.
CHEESE GUARD AND SUPPORT FOR CHEESE CUTTERS.
APPLICATION FILED AUG. 6, 1906.

3 SHEETS—SHEET 3.

Witnesses
Vernon Plummer.
Thomas W. McMeans.

Inventor
Lafe Swank and
James E. Vandeventer.
By Bradford Hood.
Attorneys

UNITED STATES PATENT OFFICE.

JAMES E. VAN DEVENTER AND LAFE SWANK, OF ANDERSON, INDIANA, ASSIGNORS TO AMERICAN CHEESE CUTTER COMPANY, OF ANDERSON, INDIANA, A CORPORATION OF INDIANA.

CHEESE GUARD AND SUPPORT FOR CHEESE-CUTTERS.

No. 846,634.      Specification of Letters Patent.      Patented March 12, 1907.

Application filed August 6, 1906. Serial No. 329,471.

*To all whom it may concern:*

Be it known that we, JAMES E. VAN DEVENTER and LAFE SWANK, citizens of the United States, residing at Anderson, in the county of Madison and State of Indiana, have invented certain new and useful Improvements in Cheese Guards and Supports for Cheese-Cutters, of which the following is a specification.

The object of our invention is to produce a guard for one cut face of a cheese of the disk type carried by a cheese-cutter of the horizontally-rotating-table type, the structure being such that the guard may be readily adjusted from time to time to compensate for shrinkage of the cheese and also such that it may be readily reversed and brought into engagement with the other surface of the cut, so that in retailing the cheese a number of cuts may be made in one direction, the guard being against the face in the other direction, and then the guard may be shifted to the more-recently-cut face and cuts taken from the old face, by this means preventing one cut face of the cheese from becoming hard or molding.

The accompanying drawings illustrate our invention.

Figure 1:
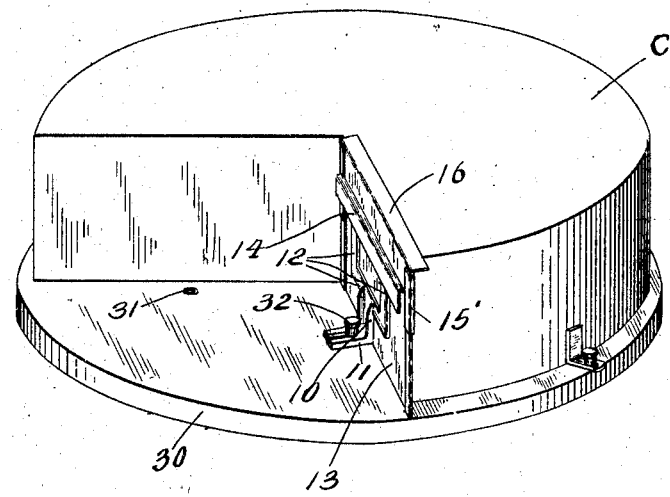
Figure 2:
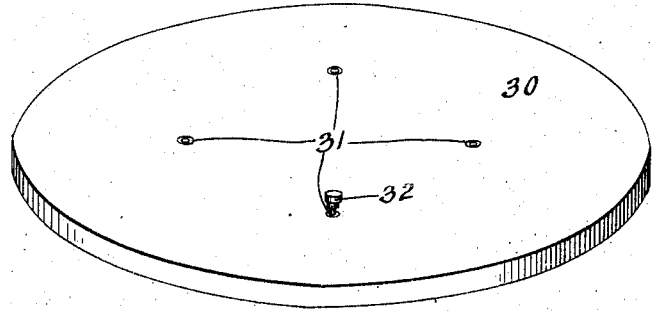
Figure 7:
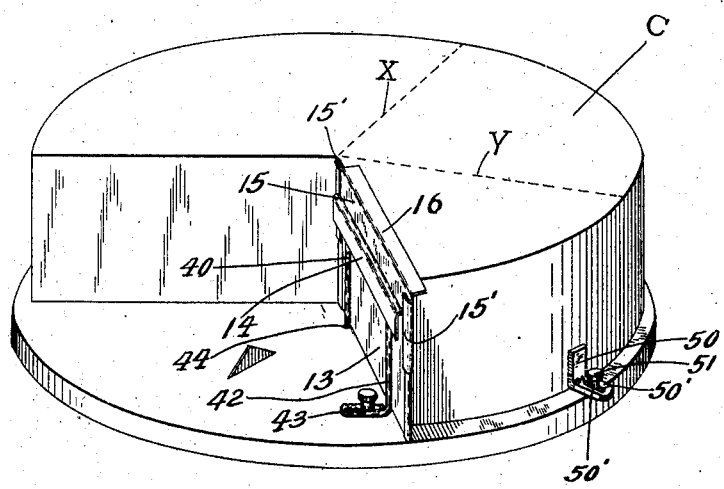

Figure 1 is a perspective view of a partially-cut disk cheese in position upon the table of a cheese-cutter of any desired and ordinary pattern, the guard being shown in position against one of the cut faces. Fig. 2 is a perspective view of the carrying-table, showing a multiplicity of means by which the guard may be secured in position at various points; Fig. 3, a plan of a portion of the cheese-carrying table with our guard in position; Fig. 4, a section on line 4 4 of Fig. 3, on a larger scale; Fig. 5, a perspective view of the cheese-face of the guard proper, and Fig. 6 a rear perspective of the support for the guard proper; Fig. 7, a view similar to Fig. 1, showing a modified form of support for the guard, and Fig. 8 a similar view with the guard removed.

In Figs. 1 to 6 of the drawings 10 indicates an L-shaped casting having a bifurcated foot 11 and a horizontally and vertically widened portion 12, forming a vertical face for the support of the lower member 13 of the guard proper. The member 13 is formed, preferably, of sheet metal and has a horizontal width equal to or slightly greater than half the diameter of the cheese C. The upper edge of the guard-section 13 is turned over and down to form a lip 14 substantially parallel with the main body 13, thus forming a socket for the reception of the upper edge of the portion 12 of the L-shaped brace 10, the arrangement being such that the member 13 may be readily shifted horizontally on the support 10 in order to facilitate adjustment toward and from the center of the cheese-carrying table 30. Vertically movable upon the guard-section 13 is a guard-section 15, the ends of which are turned, as at 15', so as to embrace the vertical edges of the guard-section 13, thus holding the guard-section securely on the section 13, but permitting easy vertical adjustment of the section 15 on the section 13. The upper edge of section 15 is turned at right angles to the main portion thereof to form a horizontal lip 16, adapted to lie over the top of the cheese, and the forward edge of this lip is provided with downturned prongs 17, adapted to enter the body of the cheese.

The guard-sections 13 and 15 should be formed of comparatively thin metal, and the metal should preferably be such as not to rust or corrode or to injuriously affect the cheese. For this purpose we find sheet-aluminium to be very satisfactory.

The cheese-carrying table 30 is provided in its upper face with a plurality of threaded bushings 31, arranged at various points around the center of the table, each of said bushings being adapted to receive the lower threaded end of a clamping-screw 32. Screw 32 is enlarged at its upper end to form a shoulder adapted to engage the upper face of the bifurcated portion of the brace 10, the threaded portion of the clamping-screw being adapted to pass through between the fingers of the portion 11.

The operation is as follows: When a wedge has been cut from a disk cheese, brace 10 is arranged adjacent one of the faces of the cut, and the guard member 13 is connected to said brace by passing the upper edge of the portion 12 between lips 14 and the main body 14. The brace 10 is then moved toward the cut face of the cheese until the guard member 13 lies closely against the face of the cheese, this adjustment being accomplished both by swinging the brace upon the screw 32 as a pivot and also by shifting the brace transversely of the screw, as well as by shifting the guard-section 15 transversely of the brace, these movements of the brace and guard permitting accurate placing of the guard into contact with all of one cut face of the cheese. The member 15 is then pushed down on the member 13 until the prongs 17 enter the body of the cheese and the lip 16 lies on top thereof. After a few days the cheese shrinks away from the guard, and as soon as this occurs the member 15 may be moved upward, so as to free it from the cheese, and the guard then brought into intimate association with the face of the cut, or, if desired, the screw 32 may be shifted to another one of the bushings 31 and the guard and brace secured thereby against the more-freshly-cut face, whereupon retailing may take place from the older side of the cut.

Figure 8:
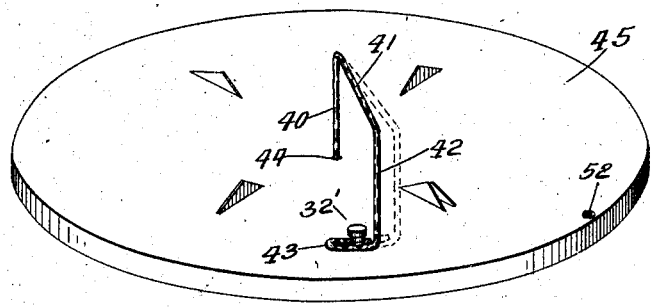

In Figs. 7 and 8 we show a modified form of support for the guard. In these figures the support for the guard is shown as consisting of a single piece of wire bent to form an upright 40, a raised horizontal member 41, an upright 42, and a foot 43, which foot lies substantially at right angles to the upright 42 and is doubled upon itself to form a passage for the reception of a fastening-screw 32'. The upright 40 is slightly longer than the upright 42, so that its lower end may be inserted in a hole 44, formed in the cheese-carrying table 45 near its center, the arrangement being such that the support may be swung about the upright 40 as an axis, as indicated by dotted lines in Fig. 8, in order to swing the guard into contact with the cut face of the cheese. The horizontal member 41 of the support is adapted to be received between the main body of the guard 13 and the lip 14 thereof.

When the cheese has been cut to the line X, Fig. 7, further cutting, especially with a swinging knife (not shown) such as is ordinarily made part of a cheese-cutter, tends to shift the cheese upon the table, and the guard is unable to resist the shifting force until after the cutting has proceeded to approximately the line Y, Fig. 7. We therefore provide a bracket 50, the upturned arm of which is adapted to lie against the circumference of the cheese, while the horizontal arm 50' is provided with a slot 50'' to receive a screw 51, which passes into a threaded bushing 52, carried by the table 45 near its circumference. When the cutting has proceeded to a point near the bracket, the bracket may be removed, for by that time the thrust of the knife will be taken by the guard.

We claim as our invention—

1. In a cheese-cutter, the combination with a support adapted to be connected to the cheese-carrying table, of a face-guard comprising a plate adapted to engage the cut face of a cheese, and intermediate connections between said guard and the support permitting radial adjustment of the plate upon the support.

2. In a cheese-cutter, the combination, with a cheese-carrying table, of a guard-support, means for connecting said support to the table, and a face-guard comprising a plate connected to the support by means permitting radial adjustment of the plate.

3. In a cheese-cutter, the combination, with a cheese-carrying table, of a guard-support, means for connecting said support to the table, said means permitting adjustment of the support angularly upon the table, and a face-guard comprising a plate connected to the support by means permitting radial adjustment of the plate.

4. In a cheese-cutter, the combination, with the cheese-carrying table, of a guard-support, means for connecting said support to the table said means permitting angular adjustment of the support upon the table, a face-guard comprising a pair of plates one vertically adjustable upon the other to vary the effective height of the guard and means for connecting said guard to the support, said means permitting radial adjustment of the guard.

5. In a cheese-cutter, the combination, with the cheese-carrying table, of a guard-support, means for connecting said support to the table, a face-guard comprising a pair of plates one vertically adjustable upon the other to vary the effective height of the guard, and means for connecting said guard to the support, said means permitting radial adjustment of the guard.

6. In a cheese-cutter, the combination, with a cheese-carrying table, of a guard-support, means for connecting said support to the table, and a face-guard comprising a pair of plates one vertically adjustable upon the other to vary the effective height of the guard, one of said members having a downturned lip adapted to overlie the upper edge of the support.

7. In a cheese-cutter, the combination, with a cheese-carrying table, having a hole in its face, of a guard-support having a pin at one end adapted to enter said hole, means for clamping the support to the table, and a guard-plate held in vertical position by said support.

8. In a cheese-cutter, the combination, with a cheese-carrying table, having a hole in its face, of a guard-support having a pin at one end adapted to enter said hole, means for clamping the support to the table, a guard-plate having a downturned lip at its upper end to receive the upper edge of the support, and a supplemented guard-plate vertically adjustable upon the other guard-plate.

In witness whereof we have hereunto set our hands and seals, at Anderson, Indiana, this 31st day of July, A. D. 1906.

JAMES E. VAN DEVENTER. [L. S.]
LAFE SWANK. [L. S.]

Witnesses:
J. GILMORE,
W. L. FINCH.